US008111880B2

(12) United States Patent
Lee et al.

(10) Patent No.: US 8,111,880 B2
(45) Date of Patent: Feb. 7, 2012

(54) METHOD AND APPARATUS FOR EXTRACTING FACIAL FEATURES FROM IMAGE CONTAINING FACE

(75) Inventors: Jong-ha Lee, Hwaseong-si (KR); Jung-bae Kim, Hwaseong-si (KR); Young-su Moon, Seoul (KR); Gyu-tae Park, Anyang-si (KR); Won-jun Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 954 days.

(21) Appl. No.: 11/896,300

(22) Filed: Aug. 30, 2007

(65) Prior Publication Data

US 2008/0199055 A1 Aug. 21, 2008

(30) Foreign Application Priority Data

Feb. 15, 2007 (KR) ........................ 10-2007-0016034

(51) Int. Cl.
*G06K 9/00* (2006.01)
*G06K 9/46* (2006.01)
*G06K 9/40* (2006.01)

(52) U.S. Cl. ......................... 382/118; 382/203; 382/260

(58) Field of Classification Search .................. 382/118, 382/203, 260
See application file for complete search history.

(56) References Cited

U.S. PATENT DOCUMENTS

| | | | | |
|---|---|---|---|---|
| 5,832,115 A * | 11/1998 | Rosenberg | .................... | 382/199 |
| 7,426,287 B2 * | 9/2008 | Yoon et al. | .................... | 382/118 |
| 7,460,693 B2 * | 12/2008 | Loy et al. | .................... | 382/118 |
| 2006/0104504 A1 * | 5/2006 | Sung | .................... | 382/159 |
| 2007/0172099 A1 * | 7/2007 | Park et al. | .................... | 382/118 |
| 2008/0118113 A1 * | 5/2008 | Jung et al. | .................... | 382/117 |
| 2008/0137917 A1 * | 6/2008 | Okubo et al. | .................... | 382/118 |
| 2008/0144941 A1 * | 6/2008 | Togashi | .................... | 382/207 |

OTHER PUBLICATIONS

Wang et al. "Bayesian Face Recognition Using Gabor Features" WBMA, Nov. 8, 2003, pp. 70-73.*

Deng et al. "A new facial expression recognition method based on local Gabor filte bank and PCA plus LDA" 2005.*

* cited by examiner

*Primary Examiner* — Brian Werner
*Assistant Examiner* — Utpal Shah
(74) *Attorney, Agent, or Firm* — Staas & Halsey LLP

(57) ABSTRACT

Provided are a method and apparatus for extracting facial features from an image containing a face. The method and apparatus filter an input image using a filter set for face recognition at each of predetermined locations in the input image, merge values obtained by filtering the input image at locations, which are horizontally symmetrical to each other with respect to the center of the face, and synthesize values obtained by filtering the input image at locations which are not symmetrical to each other with respect to the center of the face with the merged values. Therefore, the time, feature values, and storage space required to extract or compare facial features can be significantly reduced. In addition, a face recognition system that runs well on low specification hardware can be implemented.

15 Claims, 4 Drawing Sheets
(1 of 4 Drawing Sheet(s) Filed in Color)

METHOD AND APPARATUS FOR EXTRACTING FACIAL FEATURES FROM IMAGE CONTAINING FACE

BACKGROUND OF THE INVENTION

This application claims the priority of Korean Patent Application No. 10-2007-0016034, filed on Feb. 15, 2007, in the Korean Intellectual Property Office, the disclosure of which is incorporated herein in its entirety by reference.

1. Field of the Invention

The present invention relates to a method and apparatus for extracting facial features from an image containing a face, and more particularly, to a method and apparatus for efficiently extracting facial features from an image, which contains a face, using symmetric information of the face while reducing the time and computation required.

2. Description of the Related Art

Face recognition technology, which extracts facial features from an image containing the face of a person and thus identifies the person, is variously used in many fields. However, extracting such facial features requires a large amount of computation and a large data storage space. Hence, it is not easy to perform face recognition using relatively low specification central processing units (CPUs) or mobile devices having small memory spaces.

FIG. 1 illustrates the configuration of a conventional face recognition apparatus which extracts facial features and performs face recognition.

Referring to FIG. 1, the conventional face recognition apparatus includes a normalization unit 100, a first feature vector extraction unit 110, a second feature vector extraction unit 120, and a comparison unit 130.

If an image containing the face of a person is input to the normalization unit 100 via an input terminal IN1, such as a camera sensor, the normalization unit 100 normalizes the input image so that it is suitable for face recognition. The normalization unit 100 detects the location of the face of the person in the input image and then detects the locations of both eyes of the person in a detected region. The normalization unit 100 normalizes the input image by rotating and resizing the input image with respect to the detected locations of the eyes, so that features of the input image can be extracted. If necessary, the normalization unit 100 also performs a preprocessing process such as illumination compensation.

The first feature vector extraction unit 110 receives the normalized input image, filters the normalized input image using a filter set for face recognition at locations of P fiducial points, which were predetermined with respect to the eyes in the normalized input image, and extracts a first feature vector. Fiducial points denote particular locations in the face which represent facial features well.

The second feature vector extraction unit 120 receives the first feature vector and extracts a second feature vector by reducing the dimension of the received first feature vector. That is, the second feature vector extraction unit 120 extracts the second feature vector by applying a dimension reduction interpretation technique, such as principle component analysis (PCA) or linear discriminant analysis (LDA), to the first feature vector. Since the second feature vector is directly used for face recognition, it is also referred to as a feature vector for face recognition.

The comparison unit 130 receives a pre-stored feature vector for face recognition through an input terminal IN2 and receives the second feature vector from the second feature vector extraction unit 120. The comparison unit 130 compares the correlation or distance between the second feature vector and the pre-stored feature vector for face recognition and obtains a value representing the similarity between the second feature vector and the pre-stored feature vector for face recognition. The value representing the similarity obtained by the comparison unit 130 is output through an output terminal OUT1.

FIG. 2 illustrates the first feature vector extraction unit 110 of FIG. 1 in more detail. Referring to FIG. 2, the first feature vector extraction unit 110 includes a filtering unit 200 and a post-processing unit 210.

The filtering unit 200 receives a normalized image through an input terminal IN3. In addition, the filtering unit 200 receives P fudicial points, which were predetermined with respect to both eyes in the received image, through an input terminal IN4, and receives a filter set for face recognition through an input terminal IN5. The filtering unit 200 filters the received image using the filter set at locations of the P fudicial points which were predetermined with respect to both eyes in the received image. If the filter set includes J filters, the filtering unit 200 filters the received image using the J filters at the locations of the P fudicial points. Therefore, the size of the first feature vector extracted by the filtering unit 200 is equal to a value obtained after the number of fudicial points is multiplied by the number of filters. That is, the size (N) of the first feature vector (w)=the number (P) of fudicial pints×the number (J) of filters.

FIG. 3 illustrates the second feature vector extraction unit 120 of FIG. 1 in more detail. Referring to FIG. 3, the second feature vector extraction unit 120 includes a projection unit 300.

The projection unit 300 receives the first feature vector through an input terminal IN6 and receives a basis matrix for face recognition through an input terminal IN7. The basis matrix is obtained by learning PCA and LDA. The projection unit 300 projects the first feature vector received through the input terminal IN6 onto the basis matrix obtained by learning PCA and LDA and extracts the second feature vector. In this case, a matrix having a value (M), which is set appropriately in consideration of the size (N) of the first feature vector multiplied by recognition rate or recognition speed, is used as the basis matrix for face recognition. Therefore, the second feature vector has the size of M. Here, N has a far greater value than M.

As described above, in order to extract features of an input image and perform face recognition, the first feature vector must be extracted, and the second feature vector must be extracted by projecting the extracted first feature vector onto the basis matrix for face recognition which is obtained by learning PCA and LDA. However, since extracting the first and second feature vectors requires many computational processes and a large storage space, face recognition apparatuses with low hardware specifications cannot properly perform face recognition.

SUMMARY OF THE INVENTION

The present invention provides a method and apparatus for extracting facial features from an input image by even using a low specification central processing unit (CPU) or a device with a small memory space.

The present invention also provides a computer-readable recording medium on which a program for executing the method in a computer is recorded.

However, the objectives of the present invention are not restricted to the ones set forth herein. The above and other objectives of the present invention will become more apparent to one of ordinary skill in the art to which the present invention pertains by referencing a detailed description of the present invention given below.

According to an aspect of the present invention, there is provided a method of extracting facial features from an image containing a face. The method includes filtering the image using a filter set for face recognition at each of predetermined locations in the image; merging values obtained after the image is filtered at locations which are horizontally symmetrical to each other with respect to the center of the face; and synthesizing the values obtained by filtering the image with values obtained by merging the values.

According to another aspect of the present invention, there is provided a computer-readable recording medium on which a program for executing the method in a computer is recorded.

According to another aspect of the present invention, there is provided an apparatus for extracting facial features from an image containing a face. The apparatus includes a filtering unit filtering the image using a filter set for face recognition at each of predetermined locations in the image; a merging unit merging values obtained after the image is filtered at locations which are horizontally symmetrical to each other with respect to the center of the face; and a synthesis unit synthesizing the values obtained by the filtering unit with values obtained by the merging unit.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
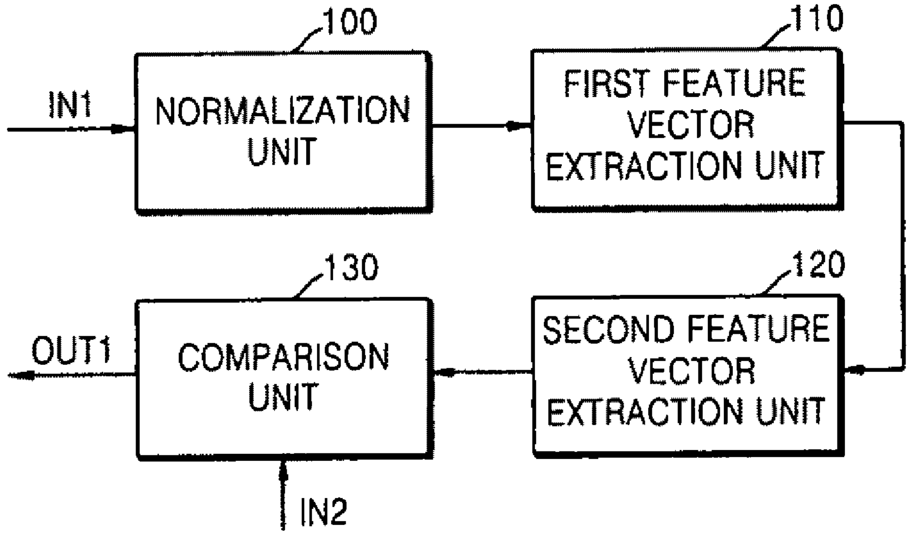
FIG. 1 illustrates the configuration of a conventional face recognition apparatus which extracts facial features and performs face recognition.
Figure 2:
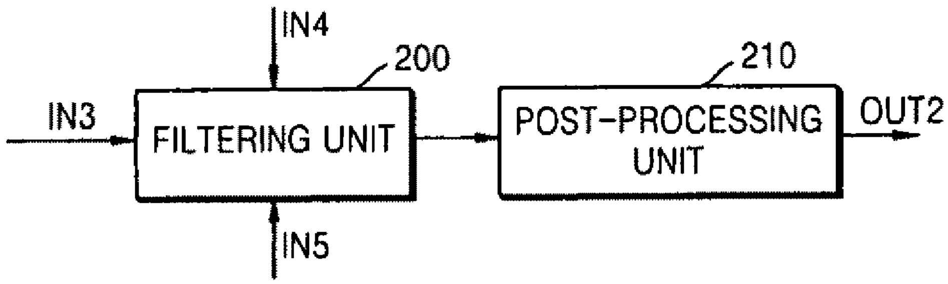
FIG. 2 illustrates a first feature vector extraction unit of FIG. 1 in more detail.
Figure 3:
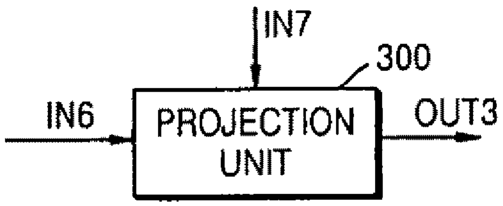
FIG. 3 illustrates a second feature vector extraction unit of FIG. 1 in more detail.
Figure 4:
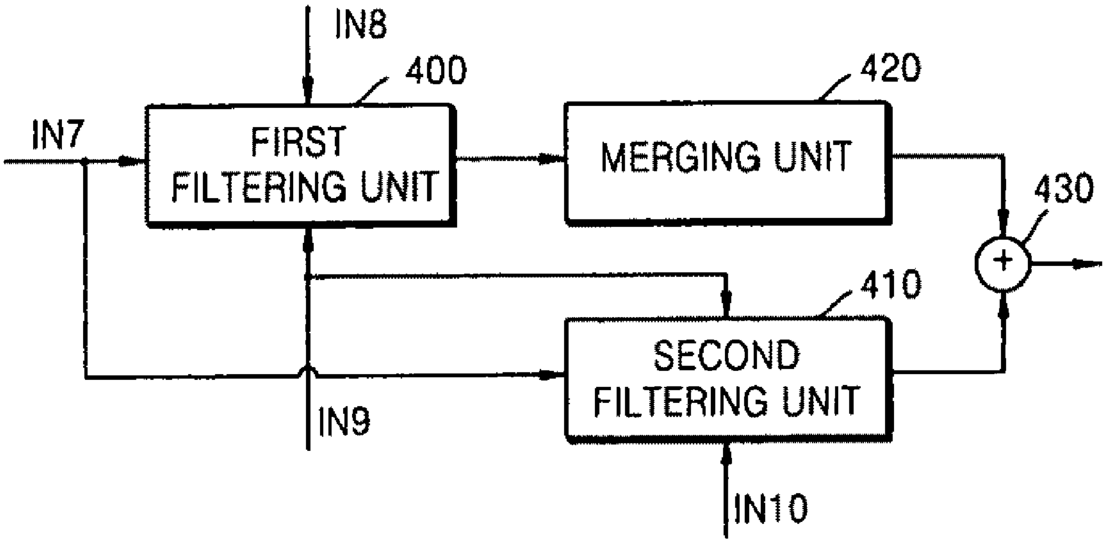
FIG. 4 illustrates an apparatus for extracting a first feature vector according to an embodiment of the present invention.

FIG. 4 illustrates an apparatus for extracting a first feature vector according to an embodiment of the present invention. Referring to FIG. 4, the apparatus includes a first filtering unit 400, a second filtering unit 410, and a merging unit 420.

The first filtering unit 400 receives a normalized image through an input terminal IN7 and receives S pairs of fiducial points, which are horizontally symmetrical to each other with respect to the center of a face, through an input terminal IN8. In addition, the first filtering unit 400 receives a filter set for face recognition through an input terminal IN9, wherein the size of the filter set is J (that is, the filter set includes J filters). Since a pair of fiducial points denotes two fiducial points, the S pairs of fiducial points are equal to 2S fiducial points.

Figure 5A:
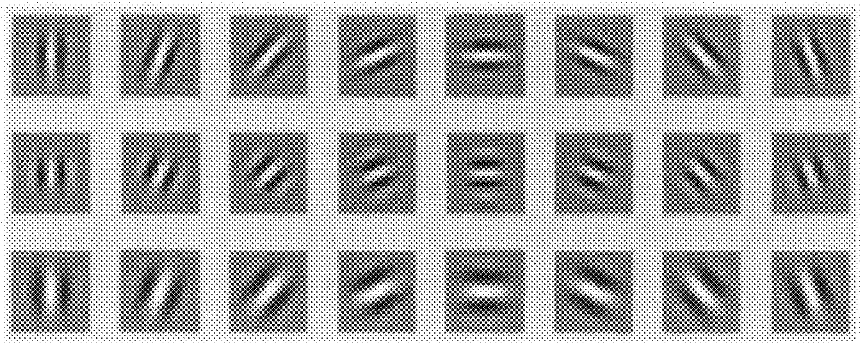
FIG. 5A illustrates a real part of a filter set for face recognition according to an embodiment of the present invention.
Figure 5B:
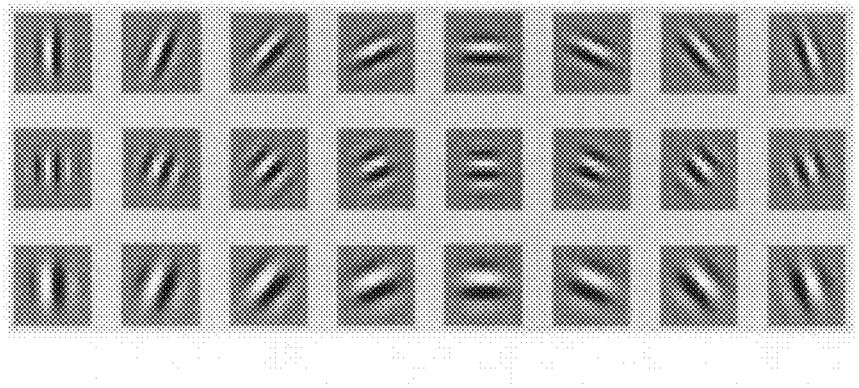
FIG. 5B illustrates an imaginary part of the filter set for face recognition according to an embodiment of the present invention.

FIGS. 5A and 5B illustrate a filter set for face recognition used in an embodiment of the present invention.

In the present embodiment, a Gabor filter set is used as the filter set for face recognition. Referring to FIGS. 5A and 5B, the Gabor filter set is classified into three scales, eight directions, a real number, and an imaginary number. Therefore, the number (J) of filters included in the Gabor filter set is 3×8×2=48. FIG. 5A illustrates a real part of the Gabor filter set, and FIG. 5B illustrates an imaginary part of the Gabor filter set. In the real number part illustrated in FIG. 5A, filters in the same row are of the same size, and filters in the same column have the same direction. Similarly, in the imaginary number part illustrated in FIG. 5B, filters in the same row are of the same size, and filters in the same column have the same direction. Here, the size (N) of the first feature vector is the number (P) of fiducial points multiplied by the number (J) of filters (that is, P×J) and may be defined by $w=\{f_{j,p}:j\in\{0,1,2 \text{ through to } J-1\}, p\in\{0,1,2,3 \text{ through to } P-1\}\}$.

Referring back to FIG. 4, the first filtering unit 400 filters the normalized image received through the input terminal IN7 (?) using the filter set at locations of the horizontally symmetrical fiducial points which were received through the input terminal IN8. Here, a Gabor filter may be defined by Equation (1).

$$\psi_j(z) = \frac{k_j^2}{\sigma^2}\exp\left(-\frac{k_j^2 z^2}{2\sigma^2}\right)\left[\exp(ik_j z) - \exp\left(-\frac{\sigma^2}{2}\right)\right] \tag{1}$$

$$k_j = \begin{pmatrix} k_{jx} \\ k_{jy} \end{pmatrix} = \begin{pmatrix} k_v \cos\phi_\mu \\ k_{jy}\sin\phi_\mu \end{pmatrix}$$

$$k_v = \pi \cdot 2^{-\frac{v+2}{2}},\ \phi_\mu = \frac{\mu}{8}\pi,\ j = \mu + 8v.,$$

where μ indicates a parameter determining the direction of the Gabor filter, and ∪ indicates a parameter determining the size of the Gabor filter. In addition, j indicates an index of each Gabor filter, σ indicates the standard deviation of a Gaussian envelope, and z indicates a position vector of each pixel of an image.

Each component of the first feature vector, to which a $j^{th}$ Gabor filter has been applied at the location of a $p^{th}$ fiducial point out of the 2S fiducial points, is defined by Equation (2).

$$f_{j,p} = \int (\tau)\psi_j(z_p - \tau)d^2\tau = a_{j,p}\exp(i\phi_{j,p})$$

where $\alpha_{j,p}$ indicates the size of $f_{j,p}$, $\phi_{j,p}$ indicates an angle of $f_{j,p}$, and $f_{j,p}$ indicates each component of the first feature vector. Therefore, the first feature vector (w) is defined by $\{f_{j,p}\}$ which is a set of $f_{j,p}$ for (at?) fiducial points (which is a set of $f_{j,p}$ used for face recognition at locations of fiducial points)

Since the first filtering unit 400 filters the received image using the J Gabor filters at the locations of the horizontally symmetrical fiducial points, the first feature vector extracted by the first filtering unit 400 may be represented by the number of components equal to the number (2S) of horizontally symmetrical fiducial points multiplied by the number (J) of filters. That is, the size of the first feature vector extracted by the first filtering unit 400 is 2S×J.

The second filtering unit 410 receives the normalized image through the input terminal IN7. In addition, the second filtering unit 410 receives A fiducial points, which are not horizontally symmetrical to each other with respect to the center of the face, through an input terminal IN10 and receives a filter set for face recognition through the input terminal IN9, wherein the filter set includes J filters. The sum of the number (A) of fiducial points, which are not horizontally symmetrical, and the number (2S) of the horizontally symmetrical fiducial points is equal to the number (P) of all fiducial points. This is because the fiducial points, which are not horizontally symmetrical to each other, are those excluding the horizontally symmetrical fiducial points from among all fiducial points.

Since the second filtering unit 410 filters the received image using the filter set, which includes the J filters, at the locations of the A fiducial points predetermined with respect to both eyes in the received, normalized image, the first feature vector extracted by the second filtering unit 410 may be represented by the number of components equal to the number (A) of fiducial points which are not horizontally symmetrical to each other multiplied by the number (J) of filters.

The merging unit 420 receives the first feature vector extracted by the first filtering unit 400 and merges symmetrical components of the received first feature vector. In this case, merging denotes combining two values into a single value.

Figure 6:
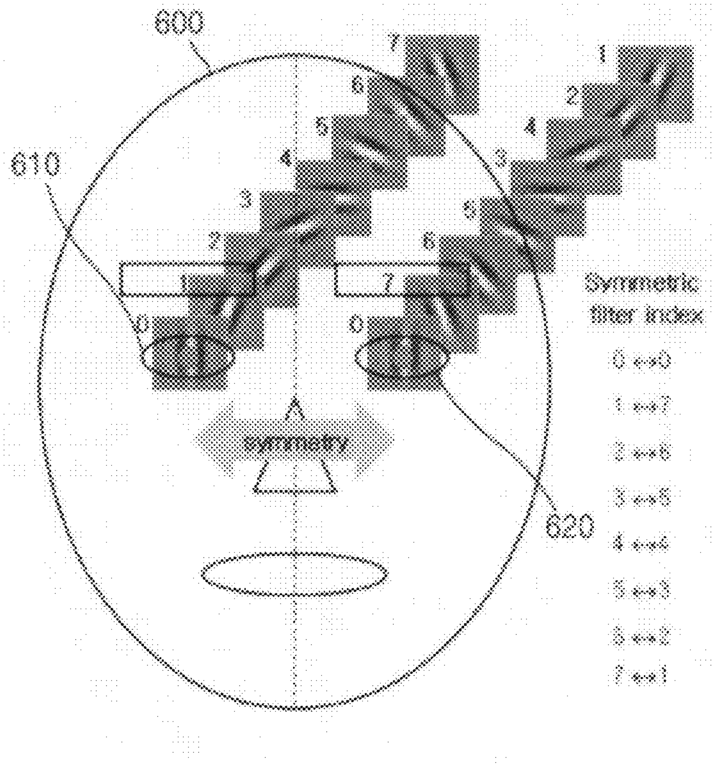
FIG. 6 illustrates the locations of symmetrical fiducial points to be merged according to an embodiment of the present invention.

FIG. 6 illustrates the locations of symmetrical fiducial points to be merged according to an embodiment of the present invention.

Referring to FIG. 6, the locations of a first fiducial point 610 and a second fiducial point 620 are horizontally symmetrical to each other with respect to the center of a face 600. If an image including the face 600 is filtered using symmetric filters at the locations of the first and second fiducial points 610 and 620, the resultant values are almost identical. If the face 600 is perfectly horizontally symmetrical, the resultant values may be identical. However, since faces are generally not perfectly horizontally symmetrical, the resultant values are not identical, but almost identical. Therefore, even after two values, which are obtained by filtering the image using the symmetric filters at the locations of the symmetrical first and second fiducial points 610 and 620, are merged, they can still represent characteristics of the first feature vector. According to a filter index indicating each filter of the Gabor filter set illustrated in FIG. 6, filter index "0" is symmetrical to filter index "0," and filter index "1" is symmetrical to filter index "7." That is, the symmetrical relationships between eight filters indicating eight directions, respectively, are as shown in Table 1. If a filter index is 8 or greater, these symmetrical relationships are repeated whenever eight filter indices are repeated by period of 8 as shown in Table 1.

TABLE 1

| | First Fiducial Point | Second Fiducial Point |
|---|---|---|
| Filter Index | 0 | 0 |
| | 1 | 7 |
| | 2 | 6 |
| | 3 | 5 |
| | 4 | 4 |
| | 5 | 3 |
| | 6 | 2 |
| | 7 | 1 |

Therefore, as shown in Table 1, values obtained after the image is filtered using the symmetric filters at the locations of the first and second fiducial points 610 and 620 may be merged into a single value. The most general way of merging the values is to average the values. Alternatively, a more reliable facial region may be detected with respect to a vertical line of symmetry of the face 600, and a value obtained after the image is filtered at a fiducial point in the facial region may be taken. That is, a weight is assigned to a value obtained after the image is filtered at a reliable fiducial point, and the weighted value and the other value may be merged. In this case, a weight of "0" to "1" is assigned. As described above, if the merging unit 420 merges values obtained after the image is filtered using the symmetric filters at the locations of the symmetrical fiducial points, the number of components of the first feature vector obtained by the first filtering unit 400 is reduced to half. Values obtained after the image is filtered using the symmetric filters at 2S symmetrical fiducial points may be merged as defined by Equation (3).

$$f_{j,p}=\text{merge}(f_{j',p'}, f_{j'',p''})\,|\,p' \text{ vs. } p'' \text{ and } j' \text{ vs. } j'' \textit{ are symmetric respectively.} \quad (3).$$

Referring back to FIG. 4, the merging unit 420 merges symmetrical components of the first feature vector received from the first filtering unit 400. Consequently, the number (2S×J) of components of the first feature vector extracted by the first filtering unit 400 is reduced by half, that is, (S×J).

A synthesis unit 430 synthesizes values obtained by the merging unit 420 as a result of its merging operation with values obtained by the second filtering unit 410 as a result of its filtering operation. That is, the number of components of the first feature vector merged by the merging unit 420 is S×J, and the number of components of the first feature vector extracted by the second filtering unit 410 is A×J. Hence, the number of components of the first feature vector synthesized by the synthesis unit 430 is (S×J)+(A×J). Since A=P−S, the number of components of the entire first feature vector synthesized by the synthesis unit 430 is (P−S)×J. That is, the size (N') of the first feature vector is (the number (P) of fiducial points−the number (S) of pairs of symmetrical fiducial points)×the number (J) of filters.

As described above, the apparatus for extracting the first feature vector according to the present embodiment can extract a smaller first feature vector than a conventional apparatus for extracting a first feature vector. That is, while the size (N) of the first feature vector extracted by the conventional apparatus is the number (P) of fiducial points×the number (J) of filters, the size (N') of the first feature vector extracted by the apparatus according to the present embodiment is [the number (P) of fiducial points−the number (S) of pairs of symmetrical fiducial points]×the number (J) of filters. Thus, N' is smaller than N.

As the size of the first feature vector is reduced, the size of a basis matrix for face recognition, which must be stored in a system in order to recognize facial features, is also reduced. Accordingly, the size of a read only memory (ROM) can be reduced. In the case of PCA-LDA learning, if the length of the first feature vector, which is an input vector for learning, is N, the size of the basis matrix, i.e., the learning result, is N×M. Here, N has a far greater value than M. Therefore, if the size of the first feature vector, which is an input vector for learning, is reduced from N to N', the size of the basis matrix that has to be loaded onto a random access memory (RAM) can be reduced by that much, thereby reducing the amount of computation required. Here, the basis matrix is pre-stored in the system and loaded onto the RAM when the system starts to operate.

The amount by which computation is reduced according to an embodiment of the present invention can be found in Table 2.

TABLE 2

| Algorithm | Amount of Computation Required to Extract First Feature Vector | Amount of Computation Required to Extract Second Feature Vector | Total Amount of Computation |
|---|---|---|---|
| Prior art | Multiplication: (17 * 17) * 48 * 128 = 1,775,616<br>Addition: (17 * 17 − 1) * 48 * 128 = 1,769,472 | Multiplication: 48 * 128 * 200 = 1,228,800<br>Addition: (48 * 128 − 1) * 200 + 200 = 1,228,800 | Multiplication: 3,004,416<br>Addition: 2,998,272 |
| Embodiment of the present invention | Multiplication: (17 * 17) * 48 * 128 = 1,775,616<br>Addition: (17 * 17 − 1) * 48 * 128 + 56 = 1,769,528<br>Division: 56 | Multiplication: 48 * (128 − 56) * 200 = 691,200<br>Addition: (48 * (128 − 56) − 1) * 200 + 200 = 691,200 | Multiplication: 2,466,816<br>Addition: 2,460,728<br>Division: 56 |

(In a first feature vector extraction process, it was assumed that the size of each filter was 17×17 and that 48 filters were used. In the current embodiment of the present invention, it was assumed that an averaging technique (for adding and dividing 56 pairs of symmetrical fiducial points once) was used in a merging process. Here, a shift operation, which takes a general system the same amount of time as addition takes, was used for division. In addition, it was assumed that the size of the basis matrix was N×200 in a second feature vector extraction process).

As described above, since there are 56 pairs of symmetrical fiducial points out of 128 fiducial points, additional computations required by the merging unit 420 to perform the merging operation are 56 additions and divisions. However, since the size of the first feature vector is reduced from N=128*48=6,144 to N'=(128−56)*48=3,456, the total amount by which required computation is reduced is as shown in Table 2. Consequently, the speed of face recognition can be increased.

In addition, since the size (assumed to a 2-byte short type integer) of learning data for extracting the second feature vector is reduced from [48×128×200]×200=2,456,600 bytes to [48×(128−56)×200]×2=1,382,400, the ROM and the RAM can be saved by approximately 44%.

Figure 7:
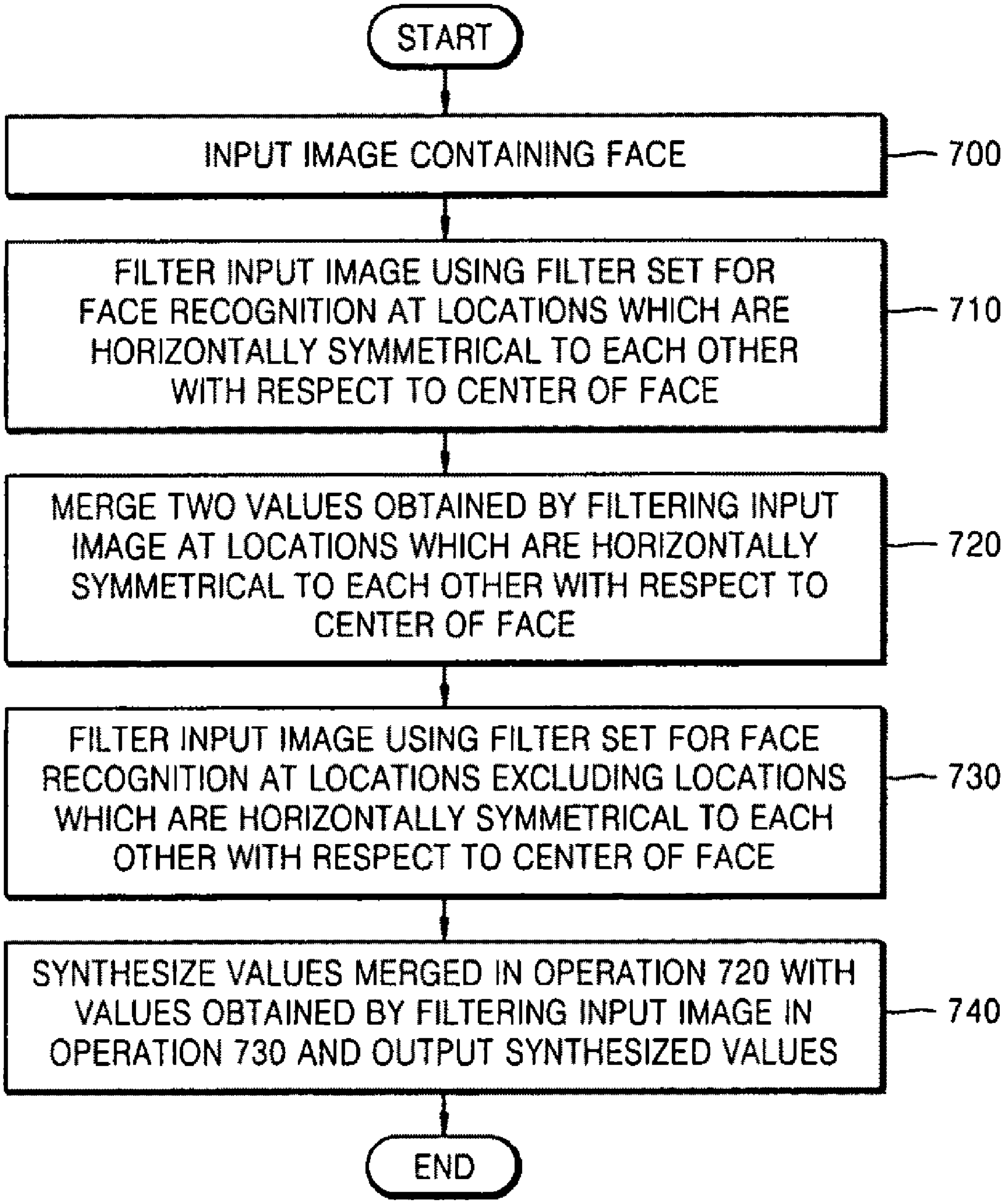
FIG. 7 is a flowchart illustrating a method of extracting a first feature vector according to an embodiment of the present invention.

FIG. 7 is a flowchart illustrating a method of extracting a first feature vector according to an embodiment of the present invention. The method of extracting the first feature vector will now be described with reference to FIGS. 4 through 6.

In operation 700, an image containing a face is input. The image containing the face denotes an image normalized to be suitable for face recognition. That is, the image containing the face denotes an image normalized by rotating and resizing the image with respect to locations of both eyes detected in the image, so that features of the image can be extracted.

In operation 710, the input image is filtered using a filter set for face recognition at locations which are horizontally symmetrical to each other with respect to the center of the face. Specifically, the input image is filtered using the filter set at S pairs of fiducial points, which are horizontally symmetrical with respect to the center of the face, among P predetermined fiducial points. The Gabor filter set illustrated in FIGS. 5A and 5B is used as the filter set for face recognition. The Gabor filter set illustrated in FIGS. 5A and 5B is classified into three scales, eight directions, a real part, and an imaginary part. Therefore, the number (J) of Gabor filters included in the Gabor filter set is 3×8×2=48. That is, the input image is filtered using the J Gabor filters at locations of the S pairs of fiducial points.

In operation 720, two values, which are obtained after the input image is filtered using symmetric filters at two locations which are horizontally symmetrical to each other with respect to the center of the face, are merged. For example, two values, which are obtained after the input image is filtered using the symmetric filters as shown in Table 1 at the first and second fiducial points 610 and 620 illustrated in FIG. 6, are merged. Generally, merging the two values denotes averaging the two values. However, a weight may be assigned to a value obtained after the input image is filtered at a reliable fiducial point, and the weighted value and the other value may be merged. If the two values are merged in this way, the size of the extracted first feature vector is reduced.

In operation 730, the input image is filtered using the filter set at locations excluding the locations horizontally symmetrical with respect to the center of the face. Fiducial points excluding the S pairs of fiducial points, which are horizontally symmetrical to each other with respect to the center of the face, from among the P predetermined fiducial points are located at the center of the face and are not horizontally symmetrical to each other. As described above, A fiducial points which are not symmetrical to each other with respect to the center of the face are filtered using the filter set.

In operation 740, values obtained from a merging process performed in operation 720 and values obtained from a filtering process performed in operation 730 are synthesized and output accordingly. Since two values obtained from the filtering process were merged in operation 720, if values obtained from the merging process performed in operation 720 are synthesized with the values obtained from the filtering process performed in operation 730, the overall size of the first feature vector is reduced.

A method and apparatus for extracting facial features from an image containing a face according to the present invention filter the image using a filter set for face recognition at each of predetermined locations in the image, merge values obtained by filtering the image at locations, which are horizontally symmetrical to each other with respect to the center of the face, and synthesize values obtained by filtering the image (at locations which are not symmetrical to each other with respect to the center of the face?) with the merged values.

Therefore, the time, feature values, and storage space required to extract or compare facial features can be significantly reduced. In addition, a face recognition system that runs well on hardware with low specifications can be implemented.

The embodiments of the present invention can be written as computer programs and can be implemented in general-use digital computers that execute the programs using a computer readable recording medium.

In addition, a data structure used in the embodiments of the present invention can be recorded on a computer-readable recording medium in various ways.

The computer-readable recording medium is any data storage device that can store data which can be thereafter read by a computer system. Examples of the computer-readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to preferred embodiments thereof, it will be understood by those skilled in the art that various changes in form and detail may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of extracting facial features from an image containing a face, the method comprising:

(a) filtering the image using a filter set for face recognition at each of predetermined locations in the image, the filtering including filtering one or more pairs of first values filtered at horizontally symmetrical locations from among the predetermined locations;

(b) merging each pair of the first values filtered at the horizontally symmetrical locations from among the predetermined locations, wherein the horizontally symmetrical locations are horizontally symmetrical to each other with respect to a longitudinal axis disposed along a center of the face, into second values representing the each pair of the first values at the horizontally symmetrical locations; and (c) synthesizing third values filtered at locations, which are not horizontally symmetrical locations, from among the predetermined locations, with the second values, when the predetermined locations include locations other than the horizontally symmetrical locations.

2. The method of claim 1, wherein operation (a) comprises:

(a1) filtering the image using the filter set at the horizontally symmetrical locations from among the predetermined locations, which are horizontally symmetrical to each other with respect to the center of the face; and (a2) filtering the image using the filter set at locations excluding the horizontally symmetrical locations from among the predetermined locations.

3. The method of claim 2, wherein the first values obtained by filtering the image in operation (a1) are merged in operation (b), and the third values obtained by filtering the image in operation (a2) are synthesized with the second values merged in operation (b) in operation (c).

4. The method of claim 1, wherein the filter set for face recognition comprises a predetermined number of filters which are classified according to scale, direction, and real number and imaginary number.

5. The method of claim 4, wherein operation (b) comprises merging the each pair of the first values using symmetric filters at two horizontally symmetrical locations which are horizontally symmetrical to each other with respect to the center of the face.

6. The method of claim 5, wherein operation (b) comprises averaging the each pair of the first values.

7. The method of claim 5, wherein operation (b) comprises assigning a weight to a value, which is obtained by filtering the image at a reliable location, among the each pair of the first values and merging the weighted value and the other value.

8. A non-transitory computer-readable recording medium on which a program for executing the method of claim 1 in a computer is recorded.

9. An apparatus for extracting facial features from an image containing a face, the apparatus comprising:

a filtering unit filtering the image using a filter set for face recognition at each of predetermined locations in the image, wherein the filtering unit filters one or more pairs of first values filtered at horizontally symmetrical locations from among the predetermined locations;

a merging unit merging, using at least one processor, each pair of the first values filtered at the horizontally symmetrical locations from among the predetermined locations, wherein the horizontally symmetrical locations are horizontally symmetrical to each other with respect to a longitudinal axis disposed along a center of the face, into second values representing the each pair of the first values at the horizontally symmetrical locations; and a synthesis unit synthesizing third values filtered at locations, which are not horizontally symmetrical locations, from among the predetermined locations, with the second values, when the predetermined locations include locations other than the horizontally symmetrical locations.

10. The apparatus of claim 9, wherein the filtering unit comprises:

a first filtering unit filtering the image using the filter set at the horizontally symmetrical locations from among the predetermined locations, which are horizontally symmetrical to each other with respect to the center of the face; and a second filtering unit filtering the image using the filter set at locations excluding the horizontally symmetrical locations from among the predetermined locations.

11. The apparatus of claim 10, wherein the merging unit merges the first values obtained by the first filtering unit, and the synthesis unit synthesizes the third values obtained by the second filtering unit with the second values merged by the merging unit.

12. The apparatus of claim 9, wherein the filter set for face recognition comprises a predetermined number of filters which are classified according to scale, direction, and real number and imaginary number.

13. The apparatus of claim 12, wherein the merging unit merges the each pair of the first values using symmetric filters at two horizontally symmetrical locations which are horizontally symmetrical to each other with respect to the center of the face.

14. The apparatus of claim 13, wherein the merging unit averages the each pair of the first values.

15. The apparatus of claim 13, wherein the merging unit assigns a weight to a value, which is obtained by filtering the image at a reliable location, from among the each pair of the first values and merges the weighted value and the other value.

* * * * *